United States Patent
Ehrhart et al.

(10) Patent No.: US 6,762,520 B1
(45) Date of Patent: Jul. 13, 2004

(54) INDUCTION-TYPE ELECTRIC MACHINE

(75) Inventors: Peter Ehrhart, Munich (DE); Goetz Heidelberg, Starnberg-Percha (DE)

(73) Assignee: Magnet-Motor Gesellschaft fur Magnetmotorische Technik mbH, Starnberg (DE)

(*) Notice: Subject to any disclaimer, the term of this patent is extended or adjusted under 35 U.S.C. 154(b) by 24 days.

(21) Appl. No.: 10/069,003

(22) PCT Filed: Aug. 14, 2000

(86) PCT No.: PCT/EP00/07929

§ 371 (c)(1),
(2), (4) Date: May 13, 2002

(87) PCT Pub. No.: WO01/15304

PCT Pub. Date: Mar. 1, 2001

(30) Foreign Application Priority Data

Aug. 20, 1999 (DE) ............................... 199 39 598

(51) Int. Cl.[7] ............................ H02K 5/10; H02K 5/12; H02K 1/12
(52) U.S. Cl. ............................ 310/86; 310/52; 310/54; 310/208; 310/254
(58) Field of Search ............................ 310/86, 254, 40 R, 310/52, 54, 208, 270, 59, 65, 179, 260, 195, 198, 269, 53, 55, 56, 57, 58, 60, 61, 214

(56) References Cited

U.S. PATENT DOCUMENTS

| | | | | |
|---|---|---|---|---|
| 2,675,493 A | * | 4/1954 | Grobel | 310/53 |
| 2,761,987 A | * | 9/1956 | Beckwith | 310/258 |
| 3,135,211 A | * | 6/1964 | Pezzillo | 417/357 |
| 4,227,108 A | * | 10/1980 | Washizu et al. | 310/214 |
| 4,513,218 A | | 4/1985 | Hansen | |
| 4,839,545 A | | 6/1989 | Chitayat | |
| 4,995,159 A | * | 2/1991 | Hancock et al. | 29/596 |
| 5,008,572 A | * | 4/1991 | Marshall et al. | 310/45 |
| 5,059,884 A | * | 10/1991 | Shah et al. | 318/701 |
| 5,075,610 A | * | 12/1991 | Harris | 318/701 |
| 5,084,662 A | * | 1/1992 | Palaniappan et al. | 318/701 |
| 5,327,069 A | * | 7/1994 | Radun et al. | 322/10 |
| 5,448,118 A | * | 9/1995 | Nakamura et al. | 310/54 |
| 5,578,879 A | | 11/1996 | Heidelberg et al. | |
| 5,703,421 A | | 12/1997 | Durkin | |
| 5,719,453 A | * | 2/1998 | Horst | 310/68 R |
| 6,046,568 A | * | 4/2000 | Pengov | 318/701 |
| 6,376,957 B1 | * | 4/2002 | Haydock et al. | 310/155 |

FOREIGN PATENT DOCUMENTS

| | | |
|---|---|---|
| DE | 1 974 109 | 12/1967 |
| DE | 67 169 | 6/1969 |
| DE | 3905997 A | 8/1990 |
| DE | 41 38 268 | 5/1993 |
| DE | 43 11 274 | 8/1994 |
| DE | 196 51 119 A1 | 7/1998 |
| JP | 06261510 A | 9/1994 |
| JP | 10201196 A | 7/1998 |
| WO | WO 0001053 A | 1/2000 |

* cited by examiner

Primary Examiner—Burton S. Mullins
Assistant Examiner—Heba Elkassabgi
(74) Attorney, Agent, or Firm—Venable LLP; Robert Kinberg; Jeffri A. Kaminski

(57) ABSTRACT

A reluctance electric machine comprising: (a) a stator part (4) with stator teeth (12) of magnetically conductive material that are provided with coil windings (24); (b) and a rotor part (6) arranged coaxially with respect to the stator part (12) and located opposite the stator part (12) so as to leave free an air gap (8) therebetween; (c) the rotor part (6) having a number of discrete poles (20) of magnetically conductive material that project in the direction towards the stator part (12), characterized in (d) that cooling with channelled coolant flow is provided at least for partial sections of the coil windings (24) of the stator part (12).

11 Claims, 3 Drawing Sheets

INDUCTION-TYPE ELECTRIC MACHINE

BACKGROUND OF THE INVENTION

The invention relates to a reluctance electric machine comprising a stator part with stator teeth of magnetically conductive material that are provided with coil windings;

and a rotor part arranged coaxially with respect to the stator part and located opposite the stator part so as to leave free an air gap therebetween, the rotor part having a number discrete poles of magnetically conductive material that project in the direction towards the stator part.

Reluctance electric machines differ from other electric machines in that they have no electromagnetic or permanent-magnetic excitation part. Reluctance electric machines operate by using the effect of magnetic attraction of magnetically conducting parts under the influence of magnetic flux flowing through are same. Both the stator and the rotor have distinctive magnetically conductive poles. The coil windings have current flowing therethrough such that they attract an adjacent rotor pole each. The current in the stator pole has to be turned off again at the proper time after attraction of the respective rotor pole, in order to release the rotor pole in running direction. For, if the coil current would continue to flow (irrespective of the direction of flow), continued attraction by the stator pole, i.e. a retroactive force, would result that would prevent further rotation of the rotor.

It is thus in the nature of reluctance electric machines that these are exploited basically half of the time only. This is why reluctance electric machines—assuming otherwise identical design parameters—normally achieve only about half of the torque values or power values in comparison with other electric motors.

SUMMARY OF THE INVENTION

It is the object of the invention to improve a reluctance electric machine of the type indicated at the outset towards higher values as regards permanent torque and permanent power.

To meet this object, the reluctance electric machine according to the invention is characterized in that cooling with channelled coolant flow is provided at least for partial sections of the coil windings of the stator part.

Preferably, the coil windings are provided with an enclosure each. As an alternative, there are preferably several coil windings commonly provided with an enclosure each. In accordance with a particularly preferred embodiment, the stator part is provided with an enclosure in its entirety. In all of the cases mentioned, there may be provided, for the space enclosed by the enclosure, one or more coolant supplies and one or more coolant discharges.

As regards the term "projecting, discrete poles" in feature (c) of claim 1, it is to be pointed out furthermore that the portions between the discrete poles may also be filled with a non-magnetic material so that the rotor part is virtually smooth on the air gap side.

The invention teaches to make the cooling of the stator part considerably more efficient than with known reluctance electric machines. The electric machine thus can be subjected to considerably higher loads—permanently and not only for short periods, as before.

The statements further below will make clear that the channelling of the coolant flow according to the invention, in practical application, mostly has the effect that the stator part of the reluctance electric machine is provided with a sealing layer on the side facing the air gap. The result of the sealing layer is that the distance between the stator poles and the rotor poles across the air gap is greater than without provision of a sealing layer. This means—with otherwise unchanged design parameters—a reduction of the magnetic flux between the respective pair of stator pole and rotor pole in consideration and thus a deterioration of the magnetic conditions of the electric machine. With the corresponding designs of the reluctance electric machine according to the invention, which have a sealing layer, this disadvantage is deliberately tolerated; according to the invention, the considerably more efficient cooling achieves a greater advantage than the deterioration of the magnetic conditions due to additional material in the air gap.

These restrictions are not applicable when the stator poles, by way of suitable enclosures, have individually associated cooling spaces or cooling channels that cover only the end face portions and do not project into the air gap.

Known reluctance electric machines also have already made use of cooling means. Known concretely are the non-specific blowing of air through the entire electric machine (stator part, air gap, rotor part) or as cooling on the stator part side directed away from the air gap. In contrast thereto, the reluctance electric machine according to the invention employs direct or quasi-direct cooling of those portions where the heat losses arise in the first place. A first major portion of generation of heat losses are the coil windings (often referred to as "copper losses"; these are caused mainly by the passage of current). According to the invention, the coil windings are cooled directly by cooling medium flowing therealong. Even if the coil windings are cooled only in the spaces between the stator teeth or only in the spaces on the face side of the stator teeth (and not in both spaces), very efficient cooling is achieved since the material of the coil windings, which has good current conducting properties, also provides for good conduction of the heat losses to the portions cooled concretely. Another major place of generation of heat losses are the stator teeth (often referred to as "iron losses" in simplified manner; these losses are caused mainly by the continuous alternation between magnetization and demagnetization or remagnetization of the stator teeth). The described cooling operation by flow of cooling medium through spaces accommodating coil windings of the stator part, at the same time constitutes cooling of the stator teeth since—at least with many design types of the coil windings—the cooling medium flows in the spaces mentioned so as to reach the stator teeth and since the coil windings establishing physical contact with the stator teeth dissipate heat from the stator teeth by thermal conduction. Furthermore, the cooling medium usually flows along the stator back between the stator teeth; the stator back receives heat from the stator teeth by thermal conduction.

A preferred development of the invention provides that the stator teeth have internal flow passages for cooling medium. This provides for direct, particularly efficient internal cooling of the stator teeth. Furthermore, it is pointed out as preferred possibility according to the invention to provide in addition to, or instead of, the described internal cooling of the stator teeth, internal flow passages for cooling medium in the region of the stator part which are set back from the stator teeth.

It is expressly pointed out that the term "reluctance electric machine" used in the present application comprises both electric motors (conversion of electric energy to mechanical energy) as well as current generators (conversion of mechanical energy to electric energy). In addition thereto, it is expressly pointed out that the term "stator part" is not supposed to mean that the stator part cogently is to be non-moving, and that the term "rotor part" is not supposed to mean that the rotor part cogently is supposed to be a rotatable part of the electric machine. Rather, it is easily possible to provide the stator part (i.e. the part of the electric machine provided with coil windings) as rotating machine part and the rotor part as stationary, non-moving machine part. The inverse design, however, is usually more favorable since the current windings having current supplied thereto and, in case of the generator, discharged therefrom, are located on a stationary machine part, whereby sliding contacts are avoided. In addition thereto, the possible embodiment is to be mentioned that both the stator part and the rotor part rotate at different speeds and/or different directions of rotation, in particular when they are connected to each other via a gear system or part of a gear system, e.g. a planetary gear system.

The electric machine according to the invention preferably is formed with electronic activation and deactivation of the coil winding, currents. By means of a suitable sensor or on the basis of electric information from feeding the electric motor, the rotational relative position between stupor part and rotor part is ascertained; the current through the coil windings is turned on and off again at the proper time each. Suitable electric circuits and suitable electronic components for realizing the described current control for electric motors and current withdrawal for generators, respectively, are known and need not be described here in more detail.

The reluctance electric machine according to the invention may be designed to have a—roughly speaking—cylindrical air gap (so that cooperating pairs of stator pole and rotor pole, so to speak, are "confronting" each other in radial direction) or—roughly speaking—an air gap located in a plane perpendicularly to the axis of rotation of the rotor part (so that cooperating pairs of stator pole and rotor pole, so to speak, are "confronting" each other in axial direction). It is possible in both cases to make use of several air gap portions, i.e. for example several cylindrical air gap portions on different diameters of the electric machine or several "planar" air gap portions axially beside each other; in both cases there is formed a sequence of stator part—rotor part—stator part—rotor part—stator part etc.

In a preferred embodiment of the invention, the stator part is provided with a sealing layer on the side facing the air gap. By means of the sealing layer, it is possible in particularly simple manner in terms of construction to seal the spaces accommodating the coil windings in the direction towards the air gap in tight manner with respect to the cooling medium. For sealing the spaces on the face side of the stator teeth in the other directions so as to provide tightness with respect to the cooling medium, it is possible in particular to provide for each stator tooth a component part of U-shaped cross-section. These circumstances will be described in more detail further below in the description of a concrete embodiment.

In case of the—roughly speaking—cylindrical air gap, the sealing layer normally is cylindrical or substantially cylindrical. In case of the "planar" air gap arranged perpendicularly to the axis of rotation, the sealing layer normally is planar or substantially planar and, in a front view, has substantially the shape of a ring of a circle.

Preferably, the sealing layer has a first layer for fulfilling the sealing function and a second layer for taking up the forces acting on the sealing layer. The first layer may preferably by a plastics film. The second layer may preferably consist of plastics material, in particular fiber-reinforced plastics material (e.g. reinforced with carbon fibers). As regards the forces acting on the sealing layer, especially the forces due to excess pressure of the cooling medium and centrifugal forces due to rotation of the stator part (with a machine design with rotating stator part) should be mentioned. The thickness of the sealing layer is preferably 0.3 to 1.5 mm.

The reluctance electric machine according to the invention may use either liquid cooling medium or gaseous cooling medium. Liquid cooling medium as a rule leads to higher cooling efficiency.

In case of the design with—roughly speaking—cylindrical air gap, it is possible to select either a design with external rotor (the rotor part has its rotor poles located radially farther outside than the air gap) or a design with internal rotor (the stator part has its stator teeth located radially farther outside than the air gap). In the former case, the rotor part often is of pot-shaped configuration in its entirety. The same holds for rotors having the aforementioned multiple air gap of cylindrical configuration.

Preferably, the stator part, on the side directed away from the rotor part, is designed such that the heat transfer is increased. This can be achieved by increasing the surface area or also and in addition by the generation of turbulent flow. Heat dissipation ribs are indicated as a concrete example in this respect. On the "rear side" of the stator part, cooling can be effected either with the same cooling medium ad the one flowing through the flow passages associated with the coil windings. As an alternative, it is also possible to use a different cooling medium on this "rear side", e.g. cooling air supplied by a fan or air without forced movement.

Preferably, the coil windings in the winding head portions located on the face side of the stator teeth, are provided with flow passages for the cooling medium that are left free between oil winding conductors. While the coil winding in the grooves between the stator teeth normally should be wound as densely packed as possible for electric and magnetic reasons, in particular for reducing losses, it is more tolerable in the winding head portions located on the face side of the stator teeth to arrange either individual coil winding conductors in spaced apart manner or, as a further example, to leave small distances between winding layers, e.g. in axial direction. The measures mentioned serve to intensify the heat transfer in the winding head portions mentioned.

In a preferred development of the invention, the coil windings of the stator part are in the form of individual coils that are not interlinked with respect to the magnetic flux. This is conceivable, for example, such that a prefabricated individual coil is slid onto each individual stator tooth. The individual coils either are electrically connected to each other directly (e.g. in series or in parallel) or are connected individually or in groups to the electronic current control.

Preferably, there are provided a first, internal cooling circuit for circulating the cooling medium through the flow passages described, and a second, external cooling circuit for circulating another cooling medium, with the external cooling circuit being connected to the internal cooling circuit via a heat exchanger. The cooling medium in the internal cooling circuit and the additional cooling medium in the external cooling circuit may be the same cooling media. However, particularly preferred is a design in which the cooling medium in the internal cooling circuit is electrically non-conductive oil and the additional cooling-medium in the external cooling circuit is a different cooling liquid, in particular water. As a rule, there is provided an additional heat exchanger via which the external cooling circuit dissipates its heat to the environment.

Preferably, the internal cooling circuit has a circulation pump of its own. The internal cooling circuit and the heat exchanger preferably are integrated in terms of space on the reluctance electric machine. The external cooling circuit may, but does not have to, extend a distance away from the reluctance electric machine.

The described design with two coupled cooling circuits allows the necessary volume of cooling medium in the internal cooling circuit to be kept low. This is favorable since, as a general rule, special cooling medium has to be employed here which may establish contact with the portions of the electric machine subjected to the coolant, without disturbance being caused thereby. These specific cooling media, e.g. electrically non-conductive cooling oil, are comparatively expensive.

A concrete embodiment for an electric motor cooling means with internal and external cooling circuits is described in German patent application 196 51 119.4. The total contents of this laid open publication is made part of the instant application by making reference thereto. Preferably, the reluctance electric machine according to the invention has one or more features that are disclosed in said German patent application 196 51 119.4.

BRIEF DESCRIPTION OF THE DRAWINGS

The invention and further developments of the invention shall be elucidated in more detail in the following by way of an embodiment shown schematically in the drawings in which.

DETAILED DESCRIPTION OF THE INVENTION

Figure 1:
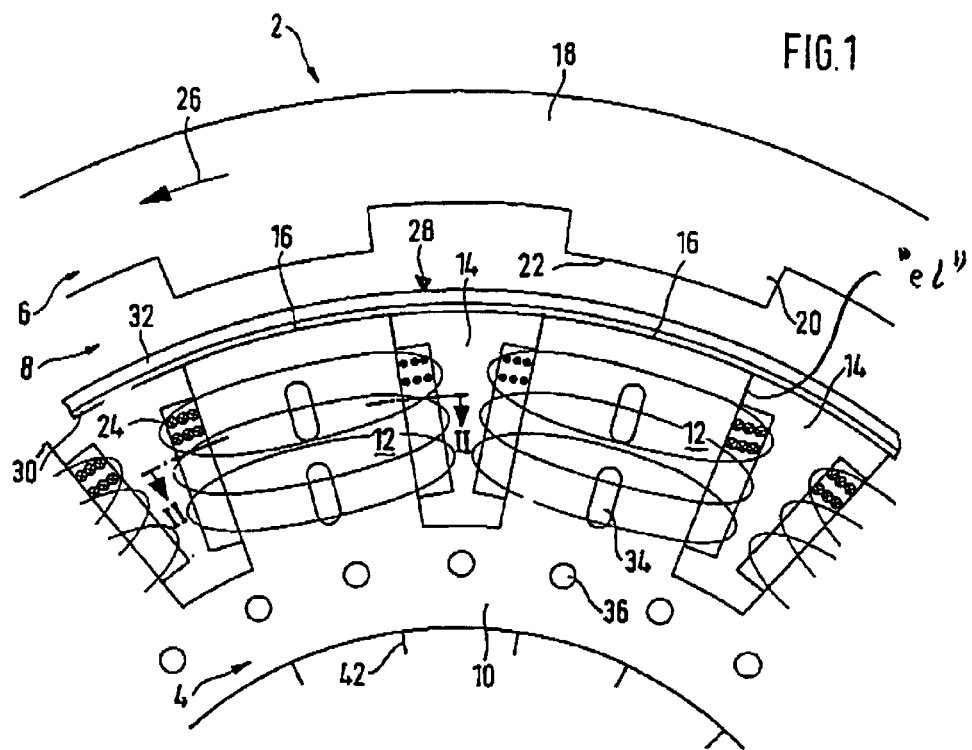
FIG. 1 shows a reluctance electric machine in a cross-sectional view (which is transverse to the axis of rotation of the machine)

FIG. 1 illustrates most clearly a stator part 4 located radially farther inside, a rotor part 6 located radially farther outside, and therebetween a—roughly speaking—cylindrical air gap of a reluctance electric machine, which in the following will be briefly referred to as "electric machine 2" only.

The stator part 4 of the electric machine 2 has a base portion 10 located radially farther inside and having stator teeth 12 projecting radially outwardly therefrom. Progressing in circumferential direction, there is provided a series of stator teeth 12. A groove 14 is provided between two adjacent stator teeth 12 each. The stator teeth 12 are slightly rounded at the top in the form of a circular curve. The radially outer ends of the stator teeth 12 constitute stator poles 16 which are all located on a common cylinder surface.

The stator part 4, as described hereinbefore, consists with its base portion 10 and its stator teeth 12 of stator sheets which are stacked successively in the direction perpendicularly to the drawing plane of FIG. 1 and are connected to each other e.g. by adhesive bonding.

Located farther radially outside, the rotor part 6 has a base portion 18 from which project discrete rotor poles 20 in the direction towards the air gap 8. The rotor pole surfaces 22—as measured in circumferential direction—are substantially as long as the stator pole surfaces 16.

Both the stator part 4, as described so far, along with its base portion 10 and its stator teeth 12, and the rotor part 6 along with its base portion 18 and its rotor poles 20, consist of magnetically conducting material.

Each stator pole 12 has a coil 24 arranged thereon. Each stator tooth 12 has a winding wound in opposite direction to that of its two neighboring stator teeth 12.

This illustrated embodiment of the electric machine 2 has a rotatable external rotor part 6 whose axis of rotation is indicated with an arrow 26. The stator part 4 is non-rotatable. In the rotational relative position of rotor part 6 relative to the stator part 4, as illustrated in FIG. 1, the windings 24 of all stator teeth 12 are activated. As soon as the rotor part 26 has moved a distance further in a counter-clockwise direction, i.e., when rotor poles 20 are each substantially opposite a stator pole 16, the current is turned off for all windings 24. The rotor part 6 continues to rotate due to inertia, and the currents through the coils or windings 24 are turned on again as soon as each rotor pole 20 is arranged substantially centrally between two adjacent stator poles 16.

A sealing layer 28 is placed cylindrically around the outside of the stator pole areas 16 and is attached to the stator part 4. The sealing layer 28 consists of a radially inner, first layer 30 for fulfilling a sealing function and a radially outer, second layer 32 for taking up the forces acting on the sealing layer 28. By means of the sealing layer 28, the groove spaces located between two adjacent stator teeth 12 each are closed radially towards the outside so as to provide tightness with respect to the cooling medium.

FIG. 1 shows furthermore axially extending flow passages 34 inside the stator teeth 12 as well as axially extending flow passages 36 inside the base portion 10 of the stator part 4.

Figure 2:
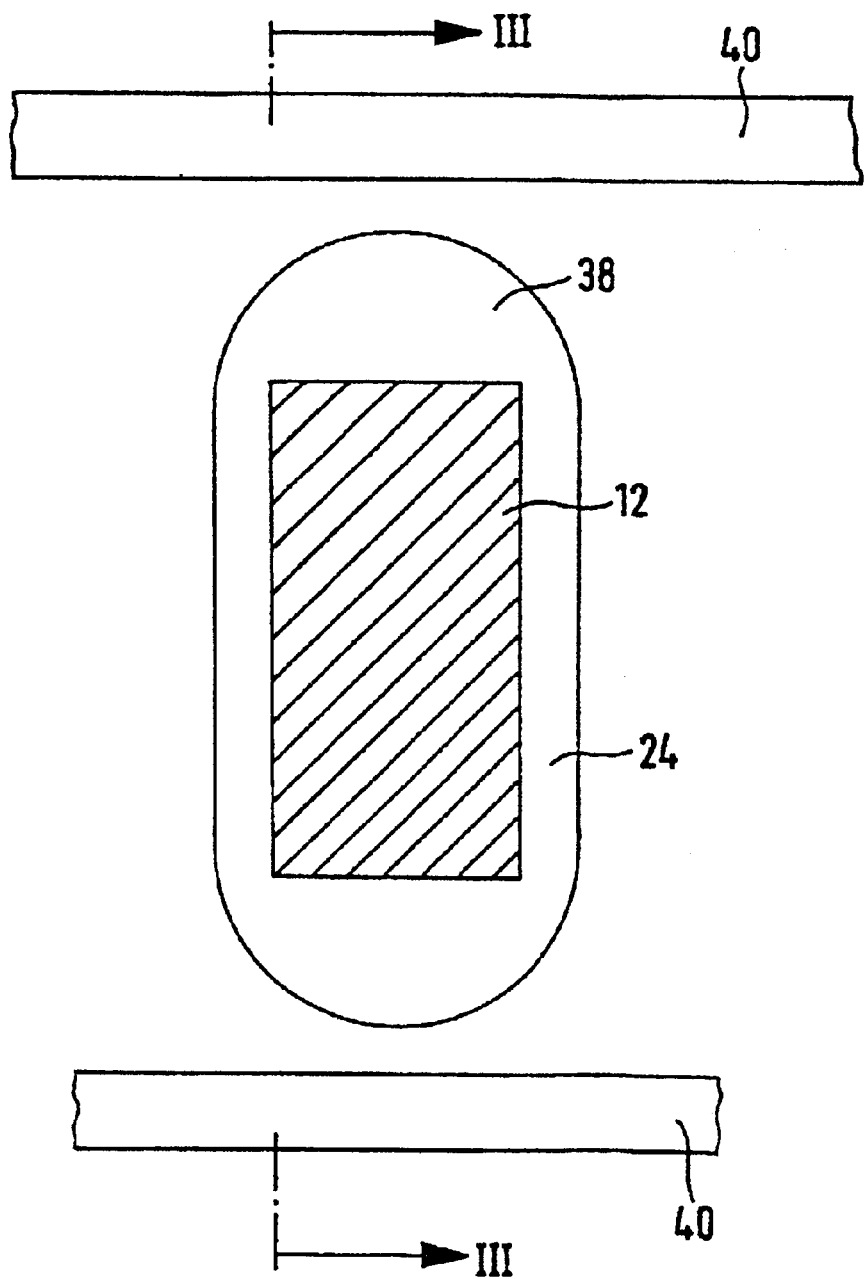
FIG. 2 shows a part of reluctance electric machine of FIG. 1 in a sectional view along the line II—II in FIG. 1 (which is in circumferential direction and then developed in the drawing plane.

FIG. 2 shows that he coils 24 are "thicker" in the winding head portions 38 located on the face side of the stator teeth 12 than in the groove portions 14. In the winding head portions 38, the individual layers of the respective coil 24 are arranged at a small spacing so that so to back internal flow passages are formed there.

Figure 3:
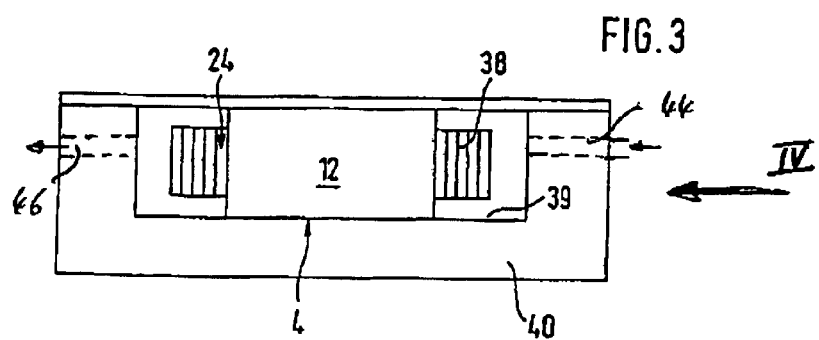
FIG. 3 shows part of the reluctance electric machine of FIG. 1 in a sectional view along the line III—III in FIG. 2 (which is a planar section containing the axis of rotation).

FIG. 3 illustrates how flow passages 39 are formed that are closed on the face side of the stator teeth 12 and extend in a circumferential direction. The stator part 4 has mounted thereon an annular enclosure 40 of U-shaped cross-section. Enclosure 40 consists, e.g., of plastic material. The legs of enclosure 40 have the sealing layer 28 resting thereon on the radial outside thereof. Arrow IV indicates the viewing direction of FIG. 4, described below.

Figure 4:
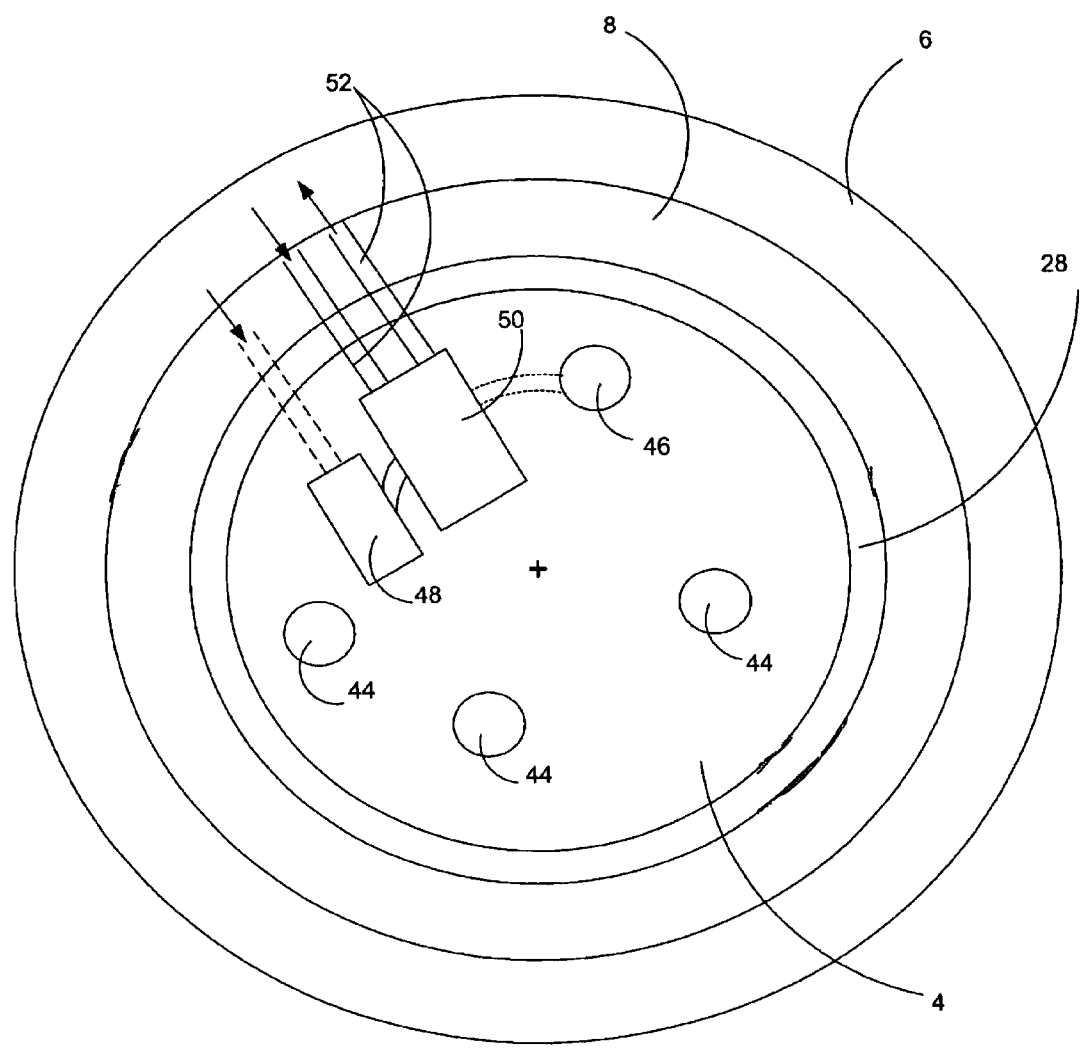
FIG. 4 shows an electric machine according to an exemplary embodiment of the present invention as seen in the direction of its axes.

In the groove portions 14 and flow passages 39, respectively, there is provided e.g. electrically non-conducting oil as cooling medium. The cooling medium can enter one of the flow passages 39, e.g. at a specific location such as coolant supply 44 as shown in FIGS. 3 and 4, for example. It then flows in circumferential direction in this flow passage 39 and cools the winding head portions 38 on this face side of the stator part 4. The cooling medium can pass over, through the groove flow passages 14, to the other circumferential flow passage 39, thus cooling in the groove flow passages 14 the regions of the coils 24 located there. The cooling medium then flows in the other circumferential flow passage 39 and is discharged at such a location, such as coolant discharge 46 in FIGS. 3 and 4, for example, that the entire stator part 4 has been cooled. As illustrated by the drawing figures as well, the flow of the cooling medium establishes contact with the stator teeth 12 at numerous locations and, at the bottom of the respective groove 14, also with the base portion 10 of the stator part 4, so that heat is dissipated from the iron components of the stator part 4 as well.

If desired, the flow passages 34 and/or 36 may be provided and have cooling medium flowing therethrough, whereby still more intensive cooling of the iron components of the stator part 4 results. In an embodiment having no U-shaped component, the stator part 4, on the inner circumferential area thereof, may be provided with ribs 42 projecting radially inwardly, so that better heat dissipation conditions are present there, e.g. to the liquid cooling medium or, in case a corresponding design of the construction, also to a gaseous cooling medium, in particular air.

FIG. 4 shows the entire electric machine 2 (See FIG. 1) as seen from the viewing direction indicated by arrow IV in FIG. 3. In addition, FIG. 4 shows exemplary locations for the at least on coolant supply 44 and at least one coolant discharge 46. Also shown in FIG. 4 are circulation pump 48, heat changer 50, and external cooling circuit 52.

What is claimed is:

1. A reluctance electric machine comprising:
    (a) a stator part with stator teeth of magnetically conductive material that are provided with coil windings;
    (b) a rotor part arranged coaxially with respect to the stator part and located opposite the stator part so as to leave free an air gap therebetween, the rotor part having a number of discrete poles of magnetically conductive material that project in the direction towards the stator part;
    (c) annular enclosure mounted on the stator part with two legs of said enclosure disposed on sides of the stator teeth forming channels between the legs and the stator teeth for channelizing coolant flow at least for partial sections of the coil windings of the stator part;
    (d) a sealing layer on the stator part facing the air gap and extending between the legs of the annular enclosure, the sealing layer comprising a first layer for fulfilling the sealing function and a second layer for taking up the forces acting on the sealing layer; and
    (e) a liquid cooling medium for flow in the channel.

2. A reluctance electric machine according to claim 1, wherein the stator teeth have internal flow passages for the cooling medium.

3. A reluctance electric machine according to claim 1, wherein the stator part and the rotor part with its rotor poles are coaxial and the stator part has a smaller diameter than the rotor part with its rotor poles.

4. A reluctance electric machine according to claim 1, wherein the stator part with its stator teeth and the rotor part are coaxial and the stator part with its stator teeth has a larger diameter than the rotor part.

5. A reluctance electric machine according to claim 1, further comprising at least one rib on the inner circumferential area of the stator part, on the side directed away from the rotor part, for increasing the heat dissipation.

6. A reluctance electric machine according to claim 1, wherein the coil windings, in the winding head portions located on the face side of the stator teeth, are formed with flow passages for the cooling medium that are left free between coil winding conductors.

7. A reluctance electric machine according to claims 1, wherein the coil windings of the stator part comprise individual coils that are not interlinked with respect to the magnetic flux.

8. A reluctance electric machine according to claim 1, further comprising a first, internal cooling circuit for circulating the cooling medium and a second, external cooling circuit for circulating another cooling medium, the external cooling circuit being connected to the internal cooling circuit via a heat exchanger.

9. A reluctance electric machine according to claim 8, further comprising a circulation pump coupled to the internal cooling circuit.

10. A reluctance electric machine according to claim 8, wherein the internal cooling circuit and the heat exchanger are integrated in a common space on the reluctance electric machine.

11. A reluctance electric machine according to claim 1, wherein the annular component is comprised of a plastic material.

* * * * *